(12) United States Patent
Sunkara

(10) Patent No.: US 7,413,677 B2
(45) Date of Patent: *Aug. 19, 2008

(54) PROCESS FOR HEAT TRANSFER UTILIZING A POLYTRIMETHYLENE HOMO- OR COPOLYETHER GLYCOL BASED HEAT TRANSFER FLUID

(75) Inventor: Hari Babu Sunkara, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/065,808

(22) Filed: Feb. 25, 2005

(65) Prior Publication Data

US 2006/0192173 A1    Aug. 31, 2006

(51) Int. Cl.
*C09K 5/00* (2006.01)
*F23L 15/02* (2006.01)

(52) U.S. Cl. .............................. 252/73; 568/619; 165/7; 165/104.9

(58) Field of Classification Search ....................... None
See application file for complete search history.

(56) References Cited

U.S. PATENT DOCUMENTS

| | | | |
|---|---|---|---|
| 2,520,733 A | 8/1950 | Morris et al. | |
| 3,326,985 A | 6/1967 | Mason | |
| 4,624,299 A | 11/1986 | Harding et al. | |
| 4,699,726 A | 10/1987 | Nolin et al. | |
| 4,758,367 A | 7/1988 | George | |
| 4,830,263 A | 5/1989 | Dexheimer | |
| 5,141,662 A | 8/1992 | Dexheimer et al. | |
| 6,562,457 B1 | 5/2003 | Goldfinger et al. | |
| 6,590,065 B1 | 7/2003 | Goldfinger | |
| 6,599,625 B2 | 7/2003 | Goldfinger et al. | |
| 6,608,168 B1 | 8/2003 | Ng | |
| 6,720,459 B2 | 4/2004 | Sunkara et al. | |
| 6,852,823 B2 | 2/2005 | Sunkara et al. | |
| 2002/0007043 A1 | 1/2002 | Sunkara et al. | |
| 2002/0010374 A1 | 1/2002 | Sunkara et al. | |
| 2003/0047708 A1 | 3/2003 | Eaton et al. | |
| 2003/0052302 A1 | 3/2003 | Eaton et al. | |
| 2004/0030089 A1 | 2/2004 | Sunkara | |
| 2004/0030095 A1 | 2/2004 | Sunkara et al. | |
| 2004/0077823 A1 | 4/2004 | Sunkara | |
| 2004/0099839 A1 | 5/2004 | Evans | |
| 2004/0127673 A1 | 7/2004 | Sunkara | |
| 2004/0225107 A1 | 11/2004 | Sunkara et al. | |
| 2004/0225161 A1 | 11/2004 | Sunkara et al. | |
| 2004/0225162 A1 | 11/2004 | Sunkara et al. | |
| 2004/0225163 A1 | 11/2004 | Sunkara et al. | |
| 2004/0249061 A1 | 12/2004 | Sunkara et al. | |
| 2004/0258923 A1 | 12/2004 | Sormani et al. | |
| 2005/0014661 A1 | 1/2005 | Sunkara | |
| 2005/0020805 A1 | 1/2005 | Sunkara et al. | |

OTHER PUBLICATIONS

Eaton, Edward R., Boon, W, H., Smith, Chris J.; "A Chemical Base for Engine Coolant/Antifreeze with Improved Thermal Stability Properties"; Engine Coolant Technology (SP-1612); SAE Technical Paper Series 2001-01-1182: SAE 2001 World Congress: Mar. 5-8, 2001.

*Primary Examiner*—Necholus Ogden

(57) ABSTRACT

A process for transferring heat from a heat generating source to a heat transfer fluid, comprising contacting the heat generating source with a heat transfer fluid for a time sufficient to effect heat transfer between the source and the fluid, wherein the heat transfer fluid comprises polytrimethylene homo- or copolyether glycol where at least about 50 mole percent of the repeating units are trimethylene ether units. In preferred embodiments the polytrimethylene homo- or copolyether glycol is selected from the group consisting of (i) polytrimethylene ether glycol, (ii) poly(trimethylene-ethylene ether) glycol, and (iii) random polytrimethylene ether ester.

24 Claims, No Drawings

PROCESS FOR HEAT TRANSFER UTILIZING A POLYTRIMETHYLENE HOMO- OR COPOLYETHER GLYCOL BASED HEAT TRANSFER FLUID

FIELD OF THE INVENTION

This invention relates to a process for heat transfer utilizing a heat transfer fluid comprising a polytrimethylene homo- or copolyether glycol.

BACKGROUND OF THE INVENTION

Heat transfer fluids ideally should be operable at a broad range of temperatures, have low viscosities to minimize pumping problems at low temperatures and provide an acceptable rate of heat transfer, have a sufficiently low freezing point, decompose only at slow rates in use, and resist the formation of degradation products that foul the systems in which they are used. Moreover, for convenient handling, clean up and disposal, it is desirable that they be environmentally non-hazardous and of low toxicity.

Several classes of heat transfer fluid compositions are well known and utilized commercially, all of which satisfy at least some of the criteria listed above. Exemplary of some of these are petroleum oils, synthetic aromatic hydrocarbons such as alkylated aromatics, phenylene oxides and diphenylene oxides and terphenyls and phenoxybiphenyls and phenoxyterphenyls, polyalkylene ether glycol type copolymers of ethylene oxide and propylene oxide, and polydimethylsiloxane based silcone fluids. All of these materials have a common disadvantage in being petroleum based and thus subject to environmental restrictions and increasing prices as the supply of petroleum diminishes.

Density, thermal conductivity, specific heat and kinematic viscosity are specific parameters that describe the performance of a heat transfer medium. Other factors such as environmental impact, toxicity, flammability, and corrosive nature can also affect the feasibility and performance of a heat transfer medium. Furthermore, the freezing and boiling points, and thermal and oxidative stability of the heat transfer fluids, restrict the operational temperature range of the heat transfer processes in which they are used.

It would be a substantial advantage if heat transfer fluids were available that were made from materials that are derived from renewable biological resources and can be used as base fluids in formulations for high operating temperatures where traditional glycols have limited use due to their volatility and poor thermal stability.

SUMMARY OF THE INVENTION

In one embodiment this invention is directed to a process for transferring heat from a heat generating source to a heat transfer fluid, comprising contacting the heat generating source with a heat transfer fluid for a time sufficient to effect heat transfer between the source and the fluid, wherein the heat transfer fluid comprises polytrimethylene homo- or copolyether glycol having trimethylene ether units as about 50 to 100 mole percent of the repeating units.

In another embodiment the invention relates to a heat transfer system comprising an object in contact with a heat transfer fluid comprising polytrimethylene homo- or copolyether glycol having trimethylene ether units as about 50 to 100 mole percent of the repeating units.

In one preferred process and heat transfer system, the heat transfer fluid further comprises a blending component, preferably in an amount of from about 1 to about 25 wt. % of the fluid, and preferably selected from the group consisting of vegetable oils, mineral oil, synthetic esters, synthetic hydrocarbons and silicones.

The invention is also directed to the heat transfer fluid. In one preferred embodiment, the heat transfer fluid comprises (a) polytrimethylene homo- or copolyether glycol having trimethylene ether units at about 50 to 100 mole percent of the repeating units and (b) a blending component selected from the group consisting of vegetable oils, mineral oil, synthetic esters, synthetic hydrocarbons and silicones, and mixtures thereof. Preferably, the heat transfer fluid comprises (a) from about 75 wt. % to 99 wt. % polytrimethylene homo- or copolyether ether glycol and (b) from about 1 to about 25 wt. % of the blending component, both by weight of the heat transfer fluid.

Examples of heat generating sources, or objects in contact with the heat transfer fluid, are selected from the group consisting of automotive radiators, industrial heat exchangers, heat recovery units, refrigeration units, solar panels, cooling towers, transformers, and heating radiators.

Preferably from about 75 to 100, more preferably from about 90 to 100, and most preferably from about 99 to 100 mole percent of the repeating units of the polytrimethylene homo- or copolyether glycol are trimethylene ether units.

In a preferred embodiment of the invention the polytrimethylene homo- or copolyether glycol is prepared from 1,3-propanediol produced from a fermentation process using a renewable biological source.

In one aspect of the invention the polytrimethylene homo- or copolyether glycol comprises polytrimethylene ether glycol having a number average molecular weight of from about 130 to about 1,500. Alternatively, the polytrimethylene homo- or copolyether glycol comprises a dimer and/or a trimer of 1,3-propanediol.

In another aspect of the invention the polytrimethylene homo- or copolyether glycol comprises poly(trimethylene-ethylene ether)glycol having a number average molecular weight of from about 120 to about 1,500.

In yet another aspect of the invention the polytrimethylene homo- or copolyether glycol comprises random polytrimethylene ether ester prepared by polycondensation of 1,3-propanediol and about 10 to about 0.1 mole percent of aliphatic or aromatic diacid or diester, and having a number average molecular weight of from about 200 to about 1,500.

It is preferred for the invention that the heat transfer fluid of the invention has a kinematic viscosity at 40° C. of from about 25 to about 500 centistokes, more preferably from about 50 to about 250 centistokes, and that it has a thermal conductivity of from about 0.10 to about 0.21 wafts/m°K at 38° C. (100° F.).

In preferred embodiments of the invention the heat transfer fluid also comprises at least one additive selected from the group consisting of antioxidants, corrosion inhibitors, thermal stabilizers, viscosity modifiers and anti-foaming agents. More preferably the heat transfer fluid further comprises at least one antioxidant in order to enhance utility at elevated temperatures.

The heat transfer fluid may also function as a cooling medium at a temperature of at least as low as about −50° C.

Preferably, the heat transfer fluid comprises from about 75 wt. % to 100 wt. % polytrimethylene homo- or copolyether ether glycol.

The heat transfer fluid may also comprise water at a level of from about 0.1 wt. % to about 50 wt. % based on the total weight of the fluid.

DETAILED DESCRIPTION OF THE INVENTION

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In one embodiment the invention is directed to a process for transferring heat from a heat generating source to a heat transfer fluid, comprising contacting the heat generating source with a heat transfer fluid for a time sufficient to effect heat transfer between the source and the fluid, wherein the heat transfer fluid comprises polytrimethylene homo- or copolyether glycol where from about 50 to 100 mole percent of the repeating units are trimethylene ether units.

Preferably from about 75 to 100 mole percent, more preferably from about 90 to 100 mole percent, and most preferably from about 99 to 100 mole percent of the repeating are trimethylene ether units.

Polytrimethylene homo- or polyether glycols are preferably prepared by polycondensation of monomers comprising 1,3-propanediol, thus resulting in polymers or copolymers containing: —(—$CH_2CH_2$—$CH_2$—O—)—, or trimethylene ether repeating units. As indicated above, at least 50% of the repeating units are trimethylene ether units. Thus, minor amounts of other polyalkylene ether repeating units may be present also. Preferably these are derived from aliphatic diols other than 1,3-propanediol. Examples of typical aliphatic diols that may be used include those derived from aliphatic diols, for example ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol-, 2,2,3,3,4,4,5,5-octafluoro-1,6-hexanediol, and 3,3,4,4,5,5,6,6,7,7,8,8,9,9,10,10-hexadecafluoro-1,12-dodecanediol, cycloaliphatic diols, for example 1,4-cyclohexanediol, 1,4-cyclohexanedimethanol and isosorbide, A preferred group of aliphatic diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof. The most preferred diol other than 1,3-propanediol is ethylene glycol.

The 1,3-propanediol employed for preparing the polytrimethylene homo- or copolyether glycols may be obtained by any of the various well-known chemical routes or by biochemical transformation routes. Most preferably, the 1,3-propanediol is obtained biochemically from a renewable source.

The most preferred source of 1,3-propanediol is a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in e.g., in the species *Klebsiella*, *Citrobacter*, *Clostridium*, and *Lactobacillus*. The technique is disclosed in several patents, including, U.S. Pat. Nos. 5,633,362, 5,686,276, and 5,821,092. In U.S. Pat. No. 5,821,092, Nagarajan et al. disclose, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the process of the invention provided a rapid, inexpensive and environmentally responsible source of 1,3-propanediol monomer.

Preferably the 1,3-propanediol used as the reactant or as a component of the reactant will have a purity of greater than about 99% by weight as determined by gas chromatographic analysis.

In a preferred embodiment of the invention the heat transfer fluids comprise at least one polytrimethylene homo- or copolyether ether glycol selected from the group consisting of (a) polytrimethylene ether glycol, (b) poly(trimethylene-ethylene ether)glycol, and (c) random polytrimethylene ether ester.

Methods for preparation of the first of these, polytrimethylene ether glycol, by dehydration of 1,3-propanediol or by ring opening polymerization of oxetane are well known in the art.

U.S. Pat. No. 2,520,733, which is incorporated herein by reference, discloses polymers and copolymers of trimethylene glycol of molecular weight from about 100 to about 10,000 and a process for the preparation of these polymers from 1,3-propanediol in the presence of a dehydration catalyst such as iodine, inorganic acids (e.g. sulfuric acid) and organic acids.

U.S. Pat. No. 3,326,985, which is incorporated herein by reference, discloses a process for forming a polytrimethylene ether glycol having an average molecular weight of 1,200-1,400. First, polytrimethylene ether glycol which has an average molecular weight of about 900 is formed using hydriodic acid dehydration catalyst. This is followed by an after treatment which comprises vacuum stripping the polyglycol at a temperature in the range of 220-240° C. and at a pressure of 1-8 mm Hg in a current of nitrogen for from 1-6 hours.

U.S. Pat. No. 6,720,459, which is incorporated herein by reference, discloses a continuous process for preparation of polytrimethylene ether glycol from 1,3-propanediol using a polycondensation catalyst, preferably an acid catalyst. The process provides high purity polytrimethylene ether glycol having a number average molecular weight of at least about 1,000.

U.S. Patent Application Publication No. 2002/0007043, which is incorporated herein by reference, describes polytrimethylene ether glycol obtained from acid catalyzed polymerization of 1,3-propanediol reactant selected from the group consisting of 1,3-propanediol and/or its oligomers or prepolymers having a degree of polymerization of 2 to 9. The polymerization product is subjected to a purification process comprising (1) a hydrolysis step to hydrolyze the acid esters formed during the acid catalyzed polymerization, (2) phase separation and water extraction steps to remove the soluble acid catalyst, generating an organic phase and a waste aqueous phase, (3) a base treatment of the organic phase to neutralize and precipitate the residual acid present, and (4) drying and filtration of the polymer to remove residual water and solids. The process provides high purity polytrimethylene having a number average molecular weight of at least about 1,000.

The dimer of 1,3-propanediol can be obtained as described in Makromol. Chem. 190, 1989, p1217-1224 and JP2004018464A. The dimer is a byproduct in the synthesis of 1,3-propanediol (Modern Plastics, March 1962, page 144) that can be isolated.

Polytrimethylene ether glycol used for the heat transfer fluids of the invention will preferably have a number average molecular weight of from about 130 (dimer) to about 1,500, more preferably from about 130 to about 1,000 and most preferably from about 130 to about 800. For molecular weights in this range the water washing step involved in purification may cause the loss of a significant amount of water sensitive oligomeric polytrimethylene ether glycol. For this reason a preferred method of preparation for material of these molecular weights avoids the hydrolysis step. Such a process is described in U.S. patent application Ser. No. 10/871622, filed Jun. 18, 2004, which is incorporated herein by reference. The process consists of: (a) polycondensing 1,3-propanediol or its dimer or trimer in the presence of an acid polycondensation catalyst at a temperature of at least about 150° C. to obtain a polytrimethylene ether glycol reaction mixture; (b) adding to the reaction mixture substantially water-insoluble base to neutralize the acid polycondensation catalyst and obtain a neutralized reaction mixture, (c) contacting the neutralized reaction mixture with filter aid having a permeability no greater than about 0.150 Darcy, and (d) separating the polytrimethylene ether glycol from the filter aid, to obtain polytrimethylene ether glycol that is essentially free of end groups derived from the acid catalyst.

The second polytrimethylene homo- or copolyether glycol type for use in the invention is poly(trimethylene-ethylene ether)glycol. Materials of this type may be prepared by methods already described in the art, in particular as disclosed in U.S. Patent Application Publication No. 2004/0030095, which is incorporated herein by reference. As disclosed there, the poly(trimethylene-ethylene ether)glycol may be prepared by a process comprising the steps of: (a) providing 1,3-propanediol reactant, ethylene glycol reactant and acid polycondensation catalyst; and (b) polycondensing the reactants to form a poly(trimethylene-ethylene ether)glycol. It may also be prepared continuously or semi-continuously using the procedure of U.S. Patent Application Publication No. 2002/10374, which is incorporated herein by reference.

The poly(trimethylene-ethylene ether)glycols are preferably prepared using at least about 1 mole percent, preferably at least about 2 mole percent and more preferably at least about 10 mole percent, and preferably up to about 50 mole percent, more preferably up to about 40 mole percent, and most preferably up to about 30 mole percent of ethylene glycol reactant based on the total amount of 1,3-propanediol and ethylene glycol reactants. The poly(trimethylene-ethylene ether)glycols are preferably prepared using up to about 99 mole percent, preferably up to about 98 mole percent, and preferably at least about 50 mole percent, more preferably at least about 60 mole percent, and most preferably at least about 70 mole percent, of 1,3-propanediol based on the total amount of 1,3-propanediol and ethylene glycol reactants.

For use in the present invention the poly(trimethylene-ethylene ether)glycol will preferably have a number average molecular weight of from about 120 to about 1,500, more preferably from about 250 to about 1,000, and most preferably from about 250 to about 800.

The third preferred polytrimethylene homo- or copolyether glycol type for use in the invention is random polytrimethylene ether ester. A preferred method for preparation of the random polytrimethylene ether esters is presented in detail in U.S. Pat. No. 6,608,168, which is incorporated herein by reference. The esters are prepared by polycondensation of 1,3-propanediol reactant and about 10 to about 0.1 mole percent of aliphatic or aromatic diacid or diester, preferably diacid By "1,3-propanediol reactant" is meant 1,3-propanediol, and oligomers and prepolymers of 1,3-propanediol having a degree of polymerization of 2 to 20, preferably 2 to 9, and mixtures thereof. In addition, "oligomer" is used to refer to dimer and trimer of 1,3-propanediol; "prepolymer" is used to refer to 1,3-propanediol based compounds having a degree of polymerization of 4 to 20. The preferred starting material for the random polytrimethylene ether ester is 1,3-propanediol and, for simplicity, applicants will refer to 1,3-propanediol in describing the invention.

The aliphatic or aromatic diacids or diesters are preferably aromatic dicarboxylic acids or esters selected from the group of terephthalic acid, isophthalic acid, bibenzoic acid, naphthalic acid, bis(p-carboxyphenyl)methane, 1,5-naphthalene dicarboxylic acid, 2,7-naphthalene dicarboxylic acid, 4,4'-sulfonyl dibenzoic acid, p-(hydroxyethoxy)benzoic acid and esters thereof. Most preferred is terephthalic acid.

Preferably the random polytrimethylene ether esters have a number average molecular weight of from about 200 to about 1,500, more preferably from about 200 to about 1,000.

The heat transfer fluid compositions of the present invention are useful in all primary and secondary heating and cooling systems. Typical examples of such systems include but are not restricted to automotive radiators, industrial heat exchangers, heat recovery units, refrigeration units, solar panels, cooling towers, transformers, and heating radiators.

Among the properties that are desirable for useful and efficient heat transfer fluids are high specific heat, high thermal conductivity, low coefficient of expansion, low viscosity, low sensitivity of viscosity to temperature, low pour point temperatures, low volatility and high flash and fire points. The polytrimethylene homo- or copolyether glycols of the invention, and the heat transfer fluids derived from them, possess a wide variety of these desirable properties.

For example, the polytrimethylene homo- or copolyether glycols of the invention and the heat transfer fluids derived therefrom will preferably have kinematic viscosities at 40° C. of from about 25 to about 500 centistokes, more preferably from about 50 to about 250 centistokes.

Preferably the polytrimethylene homo- or copolyether glycols have thermal conductivities of from about 0.10 to about 0.21 watts/m°K at 38° C. (100° F.), and more preferably from about 0.125 to about 0.21 watts/m°K at 38° C.

Other significant properties possessed by the polytrimethylene homo- or copolyether glycols of the invention are pour points preferably below about 20° C., flash points preferably above about 150° C. and autoignition temperatures above about 200° C. This combination of properties ensures that they can function satisfactorily as heat transfer fluids at temperatures at least as low as about −50° C., and at least as high as about 300° C.

The heat transfer fluids of the invention may contain in addition to the polytrimethylene homo- or copolyether glycols, one or more heat transfer fluid additives. Exemplary of the most important types of heat transfer fluid additives are antioxidants, corrosion inhibitors, and thermal stabilizers. Of lesser importance, but sometimes desirable, are viscosity modifiers and anti-foaming agents.

Stabilizers suitable for reducing the rate of thermal and oxidative degradation of the fluids of the invention include phenolic compounds such as 2,2-di(4-hydroxyphenyl)propane, phenothiazine, 3,7-dioctyl phenothiazine, phenothizine carboxylic acid esters, phenothiazines such as N-ethyl phenothizine, N-phenyl phenothiazine, etc.; polymerized trimethyldihydroquinoline; amines, such as phenyl-α-naphthylamine, phenyl-β-naphthylamine, N,N'-dioctyldiphenylamine, N,N'-diphenyl-p-phenylene diamine, N,N'-di-β-naphthyl-p-phenylene diamine, p-isopropoxy diphenylamine, N,N'-dibutyl p-phenylene diamine, N,N'-bis (1,4-dimethylpentyl)-p-phenylenediamine, N,N'-diisopropyl-p-phenylenediamine, p-hydroxydiphenylamine, etc.; hindered phenols such as dibutyl cresol, 2,6-dimethyl-p-cresol, butylated 2,2-di-(4-hydroxyphenyl)propane, N-butylatedaminophenol, etc.; butylated hydroxyanisoles, such as 2,6-dibutyl-p-hydroxyanisole,; anthraquinone, dihydroxyanthraquinone, hydroquinone, 2,5-di-t-butylhydroquinone, 2-t-butylhydroquinone; quinoline; p-hydroxydiphenylamine, phenylbenzoate, p-hydroxyanisole, nordihydroguairetic acid; pyrocatechol; styrenated phenol; polyalkyl polyphenols; propyl gallate; sodium nitrite, etc. Mixtures of the above mentioned stabilizers may be employed if desired.

Stabilizers which provide heat transfer fluids with no more than trace amounts of varnishes and/or sludges as degradation products after about 500 hours of continuous use at temperatures of about 260° C. preferably 290° C., are particularly desirable. Stabilizers selected from the group consisting of N,N'-diphenyl-p-phenylenediamine, phenothiazine, propyl gallate and 3,7-dioctylphenothiazine are particularly well suited for use. Stabilizer combinations of phenothiazine or 3,7-dioctylphenothiazine and at least one other antioxidant, preferably N,N'-diphenyl-p-phenylenediamine, are preferred.

Typically, oxidation/thermal stabilizers are present in the fluids of this invention in an amount of from about 0.1 to about 10% by weight, based upon the weight of the fluid, and more preferably in an amount of from about 0.5 to about 5% by weight. It is desirable for the stabilizer to have a solubility of at least 25 g/liter of the composition at 25° C. The oxidative stability of polytrimethylene ether glycol in the presence of 1% of phenothiazine, when tested according to ASTM D-2272, was excellent.

Additives for corrosion control include steel corrosion inhibitors such as phosphate esters, dimer acid, alkyl succinic anhydride and the like, and copper corrosion inhibitors such as benzotriazole, tolyltriazole, mercaptobenzothiazole and the like. Borates, chromates, molybdates and tungstates have also been found to be useful. Anti-corrosion additives are preferably used in an amount of from about 0.05% by weight to about 5% by weight, and more preferably from about 0.05% to about 3% by weight.

With regard to antifoaming agents, any of the art recognized materials that have sufficient thermal stability can be used. Example of suitable materials are silicones and polyalkylene oxides. Antifoam agents are preferably used in an amount of from about 0.05 to about 0.1% by weight based on the weight of the 1,3-propanediol based homo- or copolyethers.

In addition to the additives listed above, the heat transfer fluids of the invention may contain other additives such as acid-base indicators, dyes, provided that the additives are soluble in the compositions and are thermally stable at high temperatures.

In preferred embodiments, the heat transfer fluid will comprise from about 75 to 100 wt. %, more preferably from about 85 to about 100 wt. %, of the polytrimethylene homo- or copolyether glycols of the invention. The fluids may also comprise from about 1 wt. % to about 25 wt. %, preferably from about 5 to about 15 wt. %, of a blending component comprising other compatible heat transfer fluids such as vegetable oils, mineral oil, synthetic esters, synthetic hydrocarbons and silicones in addition to the polytrimethylene homo- or copolyether ether glycol. Vegetable oils are the most preferred because of their biological origin. Examples of vegetable oils include but are not limited to sunflower oil, canola oil, rapeseed oil, corn oil, olive oil, soybean oil and castor oil. In preferred embodiments, the heat transfer fluid will comprise from about 75 to 100 wt. %, more preferably from about 85 to about 100 wt. %, of the polytrimethylene homo- or copolyether glycols of the invention.

The heat transfer fluid of the invention may also contain water. Preferably, when water is present, it will be present at a level of from about 0.1 wt. % to about 50% wt. % based on the total weight of the fluid. In situations where water is present and the heat transfer composition will be in contact with metal, the use of a corrosion inhibitor is strongly preferred.

The invention is illustrated in the following examples. All parts, percentages, etc., referred to in this application (including the examples) are by weight unless otherwise indicated.

EXAMPLES

The 1,3-propanediol utilized in examples 1 and 2 was prepared by biological methods and had a purity of >99.8%.

The number-average molecular weights (Mn) of the polymer were determined by end-group analysis using NMR spectroscopic methods.

The oxidative stability of polytrimethylene homo- or copolyether ethers containing an antioxidant was evaluated according to ASTM D-2272 in the presence of water and copper at 150° C. using an oxygen-pressured bomb. ASTM D-2272 is a modified method and uses higher temperature than ASTM-D 2112.

Example 1

This example illustrates preparation of low molecular weight polytrimethylene ether glycol.

To a 5 L four-neck round bottom flask were charged 3040 g (40 moles) of 1,3-propanediol (PDO) and 15.22 g (0.155 moles, 0.5% of the PDO weight) of sulfuric acid. The reaction mixture was degassed for 10 minutes under nitrogen and then heated at 170° C. for 3 hours, followed by heating at 180° C. for 4.5 hours while being stirred at 50 rpm under a nitrogen flow rate of 0.08 L/min. The reaction by-product, which was largely water, was collected continuously during polymerization. The reaction was stopped after 673 mL of water had been collected. The crude polymer was neutralized with an aqueous slurry containing 11.5 g of calcium hydroxide and 23.7 g of deionized water at 70° C. for 2 hours. The neutralized reaction mixture was then dried at 100° C. for about 3 hours under reduced pressure to remove water. The dried polymer was filtered using a 4 L glass filtration unit equipped with a steam circulating outer layer. A No. 1 WHATMAN filter paper with 15 cm diameter was placed in the filtration unit and 32.2 g of CELPURE-65 (permeability in the range of 0.040 to 0.080 Darcy and surface area in the range of 6-7 $m^2/g$) was spread uniformly onto the filter paper. Volatiles such as unreacted 1,3-propanediol were separated by passing the entire polymer mixture (2.04 kg) through a short path distillation apparatus under 400 mTorr pressure at 120° C. The low boiling fraction collected was 118 g. The resulting purified polymer had a number average molecular weight of 510 with a polydispersity of 1.426, and a color of 21 APHA. The unsaturation in the polymer was 13 meq/kg.

The polymer was evaluated for its thermal, fluid and ignition characteristics. The results are presented in Table 1 below.

Example 2

This example illustrates preparation of poly(trimethylene ethylene ether) glycol:

The copolyether glycol was prepared by the polycondensation of 1,3-propanediol and ethylene glycol reactants as described in US2004/0030095A1. The polymer obtained had a number average molecular weight of 1,130. The properties of this copolyether are reported in Table 1.

Example 3

1,3-Propanediol dimer was isolated from the high boiling byproduct fraction of 1,3-propanediol by a fractional distillation method. The properties of the dimer are reported in Table 1.

The data in Table 1 indicate that the low molecular weight polytrimethylene ether glycol prepared in Example 1 had good heat transfer characteristics, as well as good thermal and fluid properties, and is therefore useful in heat transfer fluid formulations. The data also indicate that the polymer is relatively non-volatile with high flash and fire points, and high autoignition temperature, suggesting its utility for high temperature service at temperatures as high as about 300° C. As the data suggest, the polymers' resistance towards the initiation of oxidation can be enhanced by selecting an efficient antioxidant and its amount. The 1,3-propanediol dimer (Example 3) has a lower flash point and autoignition temperature than does the low molecular weight homo- and copolymers of 1,3-propanediol (Examples 1 and 2), suggesting that the polymer has utility for high temperature applications while the dimer is preferred for low temperature ones.

TABLE 1

Typical Properties of Polytrimethylene Homo- or Copolyether Glycols

| Performance Property | Test Method | Example 1 PDO homopolymer | Example 2 PDO copolyether | Example 3 PDO dimer |
|---|---|---|---|---|
| Thermal | | | | |
| Specific heat, cal/g ° C. | ASTM E-1269 | | | |
| @ 100° F. | | 0.504 | 0.526 | 0.537 |
| @ 200° F. | | 0.570 | 0.571 | 0.664 |
| Thermal conductivity, watts/m ° K | DSC | | | |
| @ 38° C. (100° F.) | | 0.171 | 0.174 | 0.212 |
| @ 93° C. (200° F.) | PLTL-92 | 0.169 | 0.162 | 0.242 |
| Coefficient of Expansion, cc/cc/ ° C. @ 40° C. | | $5.82 \times 10^{-4}$ | $8.68 \times 10^{-4}$ | $5.84 \times 10^{-4}$ |
| Physical | | | | |
| Boiling point, C. | ASTM D-1120 | NA | NA | 264 |
| Density @ 40° C., g/cc | | 1.0205 | 1.031 | 1.0357 |
| Viscosity, cSt | | | | |
| @ 40° C. | | 97 | 176 | 31.7 |
| @ 100° C. | | 14.9 | 28 | 4.5 |
| Pour Point, ° C. | ASTM D-97 | −24 | −41 | −60 |
| Flash Point, ° C. | ASTM D-92 | 235 | 257 | 151 |
| Fire Point, ° C. | ASTM D-92 | 257 | 276 | — |
| Autoignition Temperature, ° C. | ASTM D-2155 | 366 | 379 | 311 |
| Moisture content, ppm | | 720-880 | — | — |
| Alkalinity, meq OH/30 kg polymer | | −0.9 | — | — |
| Oxidative Stability | | | | |
| Rotating Bomb test @ 150° C., min | ASTM D-2272 | | | |
| 1% phenyl napthylamine | | 310 | — | — |
| 1% phenothiazine | | 415 | — | — |

PDO = 1,3-propanediol
PLTL = Petro-Lubricant Testing Laboratory's method

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A process for transferring heat from a heat generating source to a heat transfer fluid, comprising contacting the heat generating source with a heat transfer fluid for a time sufficient to effect heat transfer between the source and the fluid, wherein the heat transfer fluid comprises polytrimethylene homo- or copolyether glycol having trimethylene ether units as about 50 to 100 mole percent of the repeating units.

2. The process of claim 1 wherein from about 75 to 100 mole percent of the repeating units are trimethylene ether units.

3. The process of claim 1 wherein from about 90 to 100 mole percent of the repeating units are trimethylene ether units.

4. The process of claim 1 wherein from about 99 to 100 mole percent of the repeating units are trimethylene ether units.

5. The process of claim 1 wherein the polytrimethylene homo- or copolyether glycol comprises homo- or copolyether selected from the group consisting of (i) polytrimethylene ether glycol, (ii) poly(trimethylene-ethylene ether)glycol, (iii) random polytrimethylene ether ester, and (iv) mixtures thereof.

6. The process of claim 1 wherein the polytrimethylene homo- or copolyether glycol comprises polytrimethylene ether glycol.

7. The process of claim 6 wherein the polytrimethylene ether glycol has a number average molecular weight of from about 130 to about 1,500.

8. The process of claim 1 wherein the polytrimethylene homo- or copolyether glycol comprises poly(trimethylene-ethylene ether)glycol.

9. The process of claim 8 wherein the poly(trimethylene-ethylene ether)glycol has a number average molecular weight of from about 120 to about 1,500.

10. The process of claim 1 wherein the polytrimethylene homo- or copolyether glycol comprises random polytrimethylene ether ester prepared by polycondensation of 1,3-propanediol reactant and about 10 to about 0.1 mole percent of aliphatic or aromatic diacid or diester.

11. The process of claim 10 wherein the random polytrimethylene ether ester has a number average molecular weight of from about 200 to about 1,500.

12. The process of claim 1 wherein the polytrimethylene homo- or copolyether ether glycol comprises a dimer of 1,3-propanediol.

13. The process of claim 1 wherein the polytrimethylene homo- or copolyether ether glycol comprises a trimer of 1,3-propanediol.

14. The process of claim 1 wherein the heat transfer fluid further comprises a blending component selected from the group consisting of vegetable oils, mineral oil, synthetic esters, synthetic hydrocarbons and silicones.

15. The process of claim 14 wherein the amount of the blending component is from about 1 to about 25 wt. % of the weight of the fluid.

16. The process of claim 1 wherein the heat transfer fluid comprises from about 75 wt. % to 100 wt. % polytrimethylene homo- or copolyether ether glycol.

17. The process of claim 1 wherein the heat transfer fluid has a kinematic viscosity at 40° C. of from about 25 to about 500 centistokes.

18. The process of claim 1 wherein the heat transfer fluid has a kinematic viscosity at 40° C. of from about 50 to about 250 centistokes.

19. The process of claim 1 wherein the heat transfer fluid has a thermal conductivity of from about 0.10 to about 0.21 watts/m°K at about 38° C.

20. The process of claim 1 wherein the polytrimethylene homo- or copolyether glycol is prepared from 1,3-propanediol derived from a fermentation process using a renewable biological source.

21. The process of claim 1 wherein the heat transfer fluid further comprises at least one additive selected from the group consisting of antioxidants, corrosion inhibitors, thermal stabilizers, viscosity modifiers and anti-foaming agents.

22. The process of claim 1 wherein the heat transfer fluid further comprises water at a level of from about 0.1 wt. % to about 50 wt. % based on the total weight of the fluid.

23. The process of claim 1 wherein the heat transfer fluid functions as a cooling medium at a temperature of at least as low as about −50° C.

24. The process of claim 1 that is used for transferring heat in a heat transfer system selected from group consisting of automotive radiators, industrial heat exchangers, heat recovery units, refrigeration units, solar panels, cooling towers, transformers, and heating radiators.

* * * * *